US005309757A

United States Patent [19]

Hashimoto et al.

[11] Patent Number: 5,309,757

[45] Date of Patent: May 10, 1994

[54] CYLINDER IDENTIFYING APPARATUS FOR A MULTI-CYLINDER INTERNAL COMBUSTION ENGINE

[75] Inventors: Atsuko Hashimoto; Toshio Iwata, both of Himeji, Japan

[73] Assignee: Mitsubishi Denki Kabushiki Kaisha, Tokyo, Japan

[21] Appl. No.: 908,467

[22] Filed: Jul. 6, 1992

[30] Foreign Application Priority Data

Jul. 4, 1991 [JP] Japan ................................ 3-164493
Jul. 4, 1991 [JP] Japan ................................ 3-164494
Jul. 5, 1991 [JP] Japan ................................ 3-165837

[51] Int. Cl.[5] ........................................ G01M 15/00
[52] U.S. Cl. ................................ 73/116; 324/207.25
[58] Field of Search ......................... 73/116; 123/414; 324/207.25

[56] References Cited

U.S. PATENT DOCUMENTS

| | | | |
|---|---|---|---|
| 3,915,131 | 10/1975 | Brungsberg | 123/414 |
| 4,338,813 | 7/1982 | Hunninghaus et al. | 73/116 |
| 5,041,979 | 8/1991 | Hirka et al. | 73/116 X |
| 5,070,727 | 12/1991 | Davis et al. | 73/116 |

FOREIGN PATENT DOCUMENTS

| | | |
|---|---|---|
| 3742675 | 3/1988 | Fed. Rep. of Germany . |
| 3913464 | 6/1989 | Fed. Rep. of Germany . |
| 4133752 | 1/1992 | Fed. Rep. of Germany . |
| 134069 | 5/1989 | Japan . |

*Primary Examiner*—Tom Noland
*Attorney, Agent, or Firm*—Sughrue, Mion, Zinn, Macpeak and Seas

[57] ABSTRACT

A cylinder identifying apparatus for a multi-cylinder internal combustion engine can generate an exact reference position signal at an earliest possible time during engine start-up operation, thereby making it possible to identify predetermined reference positions of each cylinder in a highly accurate manner. A first signal generator 1 is provided on a camshaft for generating a cylinder identifying signal SC in synchronization with the rotation of the camshaft. A second signal generator 4 is provided on a crankshaft for generating, in synchronization with the rotation of the crankshaft, a pulse signal P containing a series of pulses each corresponding to predetermined first and second crank positions of each cylinder. A reference position signal generating circuit 2 generates, based on the output signals from the first and second signal generators, a reference position signal ST containing a series of pulses each exactly indicating the predetermined crank position of each cylinder and a cylinder identifying information signal indicative of the cylinder corresponding to each pulse of the reference position signal.

5 Claims, 9 Drawing Sheets

B5°: 1ST REFERENCE POSITION

B75°: 2ND REFERENCE POSITION

CYLINDER IDENTIFYING APPARATUS FOR A MULTI-CYLINDER INTERNAL COMBUSTION ENGINE

BACKGROUND OF THE INVENTION

The present invention relates to a cylinder identifying apparatus for a multi-cylinder internal combustion engine which can identify reference positions of each cylinder in a highly accurate manner.

In general, in a multi-cylinder internal combustion engine having a crankshaft driven by a plurality of cylinders and a camshaft operatively connected with the crankshaft, a plurality of reference position signals, which are generated by a reference signal generator in synchronism with the rotation of the crankshaft, are used for controlling engine operation such as ignition timing and fuel injection timing for each cylinder. Each of the reference position signals corresponds to a predetermined rotational angle of the crankshaft, which is hereinafter referred to as a predetermined crank angle or position. The reference signal generator is generally mounted on the crankshaft or the camshaft which is operatively connected with the crankshaft in synchronized rotation therewith.

FIG. 8 illustrates a typical example of a conventional cylinder identifying apparatus for a multi-cylinder internal combustion engine. The apparatus illustrated includes a first or cylinder identifying signal generator 201 mounted on an unillustrated camshaft, which is operatively connected to an unillustrated crankshaft of the engine for synchronized rotation therewith, for generating a cylinder identifying signal SC'', and a second or reference signal generator 202 mounted on the camshaft for generating a reference position signal ST' indicative of two predetermined reference positions corresponding to two predetermined crank angles. The cylinder identifying signal SC'' from the first signal generator 201 and the reference signal ST' from the second signal generator 202 are supplied through a first and a second interface 203, 204, respectively, to a control unit in the form of a microcomputer 205 which identifies reference positions for each cylinder based on these signals to thereby control the ignition timing for each cylinder.

Generally, the camshaft, on which the cylinder identifying signal generator 201 and the reference signal generator 202 are mounted, is operatively connected with the crankshaft such that it performs one complete revolution per two revolutions of the crankshaft.

As shown in FIG. 9, the cylinder identifying signal generator 201 generates a cylinder identifying signal SC'' comprising an appropriate number of pulses each corresponding to a specific cylinder per one camshaft revolution, and the reference signal generator 202 generates a reference position signal ST' comprising a plurality of reference pulses each corresponding to predetermined reference crank positions of a corresponding cylinder. For example, these signal generators 201, 202 may be constructed as follows. A rotating disk is mounted on the camshaft for integral rotation therewith and has a plurality of first and second arcuate slits formed therethrough. The first slits correspond in number to the cylinders and are disposed around the center of rotation of the disk at equal circumferential intervals. Each of the first slits has a leading edge and a trailing edge corresponding to two predetermined reference crank positions or angles for a corresponding cylinder. Each of the second slits corresponds to a specific cylinder. The first and second slits during the rotation of the disk are sensed by an appropriate sensing means such as a photocoupler which generates a cylinder identifying signal each time it senses one of the second slits, and a reference position signal each time it senses one of the first slits.

FIG. 9 is a waveform diagram showing the waveforms of the cylinder identifying signal SC'' and of the reference position signal ST', which are adapted for use with an engine having four cylinders #1 through #4. Here, the cylinder identifying signal SC'' includes two kinds of rectangular-shaped pulses generated for two specific cylinders, cylinder #1 and cylinder #4. The reference position signal ST' includes a series of rectangular-shaped pulses each having a leading or rising edge corresponding to a second reference position of a corresponding cylinder, e.g., 75 degrees (B75°) before top dead center (BTDC), and a trailing or falling edge corresponding to a first reference position thereof, e.g., 5 degrees (B5°) BTDC.

The operation of the above-mentioned conventional apparatus will now be described below while referring to the waveform diagram of FIG. 9. As the engine starts to operate, the first and second signal generators 201, 202 generate a cylinder identifying signal SC'' and a reference position signal ST' which are fed to the microcomputer 205. Based on these signals SC'' and ST', the microcomputer 205 senses the first reference position B5° and the second reference position B75° of each cylinder and controls the optimum ignition timing and the optimum fuel injection timing for each cylinder in a timer-controlled manner on the basis of the first and second reference positions thus sensed while reflecting the running conditions of the engine such as the rotational number (rpm), the engine load, etc.

In this case, however, since the camshaft is operatively connected with the crankshaft through a power transmission belt such as a timing belt, it is extremely difficult to always ensure that the camshaft rotates in exact synchronization with the rotation of the crankshaft. As a result, the reference position signal ST' may involve a certain degree of error and thus does not exactly reflect or indicate the predetermined crank positions.

In summary, with the conventional cylinder identifying apparatus as described above, the first and second reference positions B5°, B75°, which are detected or determined based on the reference position signal ST' from the reference signal generator 2 mounted on the camshaft, involve more or less errors, so it is impossible to perform highly precise control on the engine using the first and second reference positions.

SUMMARY OF THE INVENTION

Accordingly, the present invention is intended to overcome the above-described problems of the conventional cylinder identifying apparatus.

An object of the invention is to provide a novel and improved cylinder identifying apparatus for a multi-cylinder internal combustion engine which is able to detect or determine reference crank positions of each cylinder with improved accuracy, thereby making it possible to control engine operation based on the thus determined reference crank positions in a precise manner.

A more specific object of the invention is to provide a novel and improved cylinder identifying apparatus for a multi-cylinder internal combustion engine which is able to more precisely detect or determine predetermined reference positions for each cylinder based on a pulse signal from a pulse signal generator which is provided on a crankshaft of the engine.

In order to achieve the above object, according to the present invention, there is provided a cylinder identifying apparatus for a multi-cylinder internal combustion engine having a crankshaft and a camshaft operatively connected to the crankshaft for rotation therewith, the apparatus comprising:

a first signal generator provided on the camshaft for generating a cylinder identifying signal in synchronization with the rotation of the camshaft;

a second signal generator provided on the crankshaft for generating, in synchronization with the rotation of the crankshaft, a pulse signal containing a series of pulses each corresponding to a predetermined crank position of each cylinder;

reference position signal generating means for generating, based on the output signals from the first and second generators, a reference position signal containing a series of pulses each exactly indicating the predetermined crank position of each cylinder and a cylinder identifying information signal indicative of the cylinder corresponding to each pulse of the reference position signal.

In a preferred form, the cylinder identifying signal comprises a series of a plurality of rectangular-shaped pulses each corresponding to a specific cylinder and having pulse widths different from each other.

In another preferred form, the cylinder identifying signal comprises a series of rectangular pulses of the same pulse width corresponding to non-specific cylinders with the absence of a pulse corresponding to a specific cylinder.

In one form, the pulse signal generated by the second signal generator comprises a first pulse corresponding to a first predetermined reference position of each cylinder, and a second pulse corresponding to a second predetermined reference position of each cylinder.

In another form, the pulse signal generated by the second signal generator comprises a first pulse corresponding to a first predetermined reference position of each cylinder, and a series of second pulses of which the earliest one corresponds to a second predetermined reference position of each cylinder.

The second pulses may comprise a plurality of pulse groups each corresponding to one of the cylinders and being different in the number of pulses from each other to serve for cylinder identification.

Preferably, the reference position signal generating means comprises: a reference position signal generating section for generating a reference position signal indicative of a first and a second predetermined reference position of each cylinder; and a cylinder identifying section for counting the number of pulses in the reference position pulse signal from the second pulse generator during each high level of the cylinder identifying signal and generating a cylinder identifying information signal used for cylinder identification.

The above and other objects, features and advantages of the invention will be more readily apparent from the following detailed description of preferred embodiments of the invention taken in conjunction with the accompanying drawings.

BRIEF DESCRIPTION OF THE INVENTION

In the drawings, the same symbols identify the same or corresponding parts.

DESCRIPTION OF THE PREFERRED EMBODIMENTS

Preferred embodiments of the present invention will now be described in detail while referring to the accompanying drawings.

Figure 1:
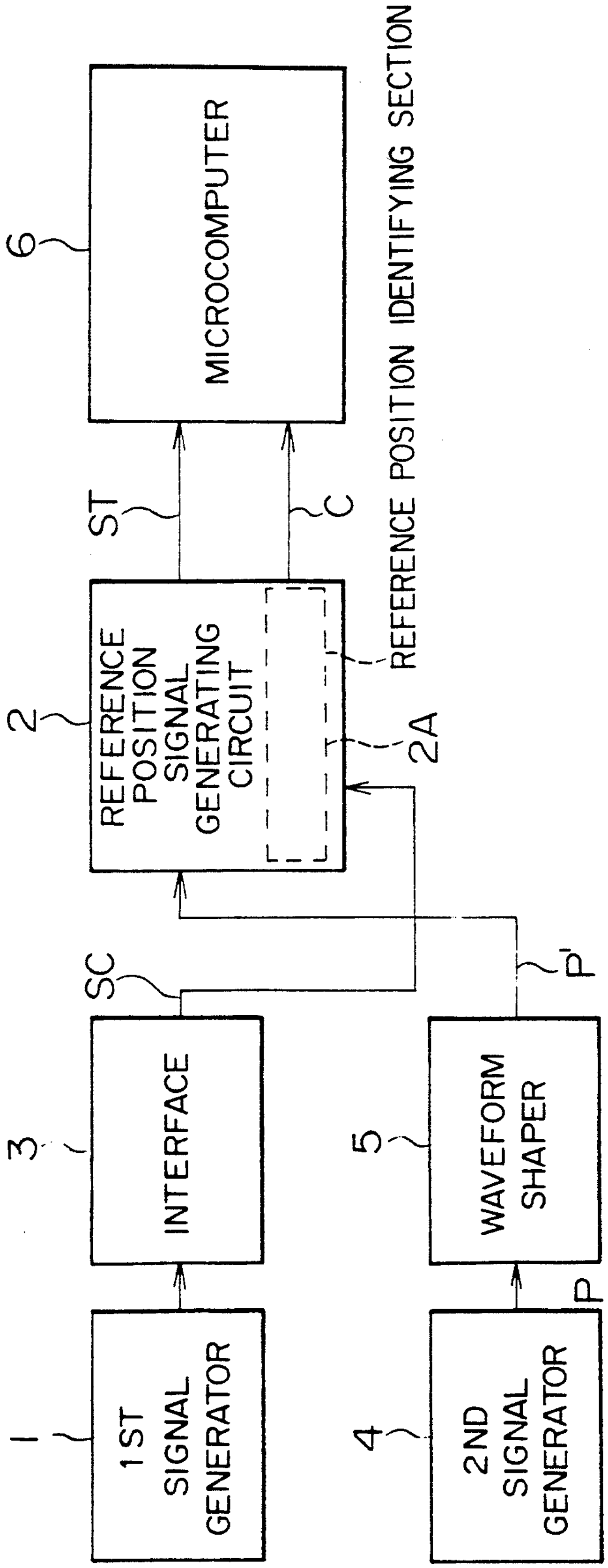
FIG. 1 is a block diagram showing the general arrangement of a cylinder identifying apparatus in accordance with one embodiment of the invention.
Figure 2:
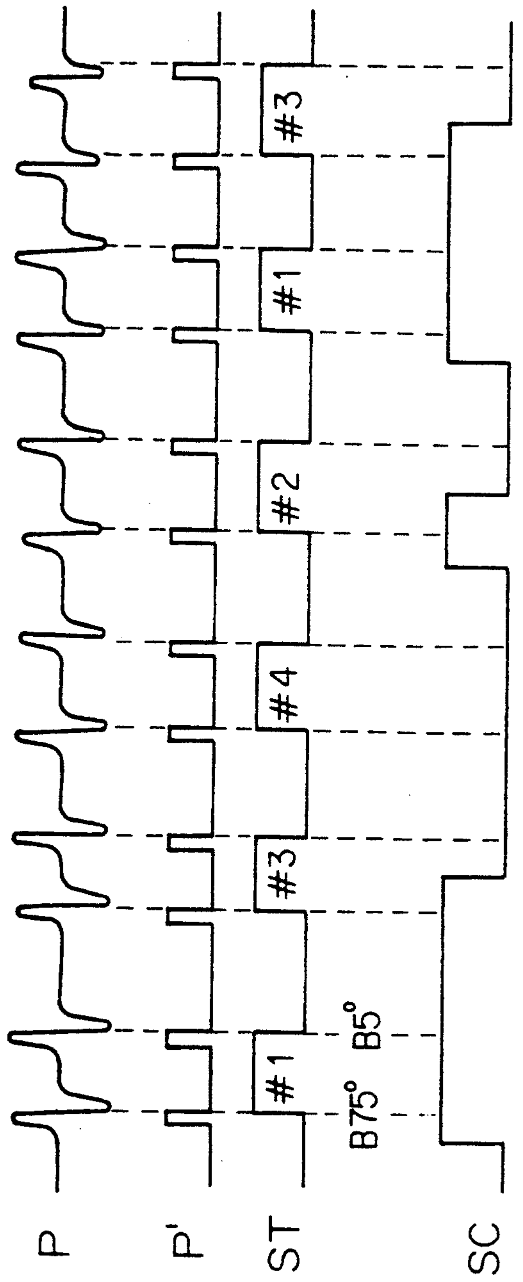
FIG. 2 is a waveform diagram showing one example of waveforms of various signals used in the apparatus of FIG. 1.
Figure 8:
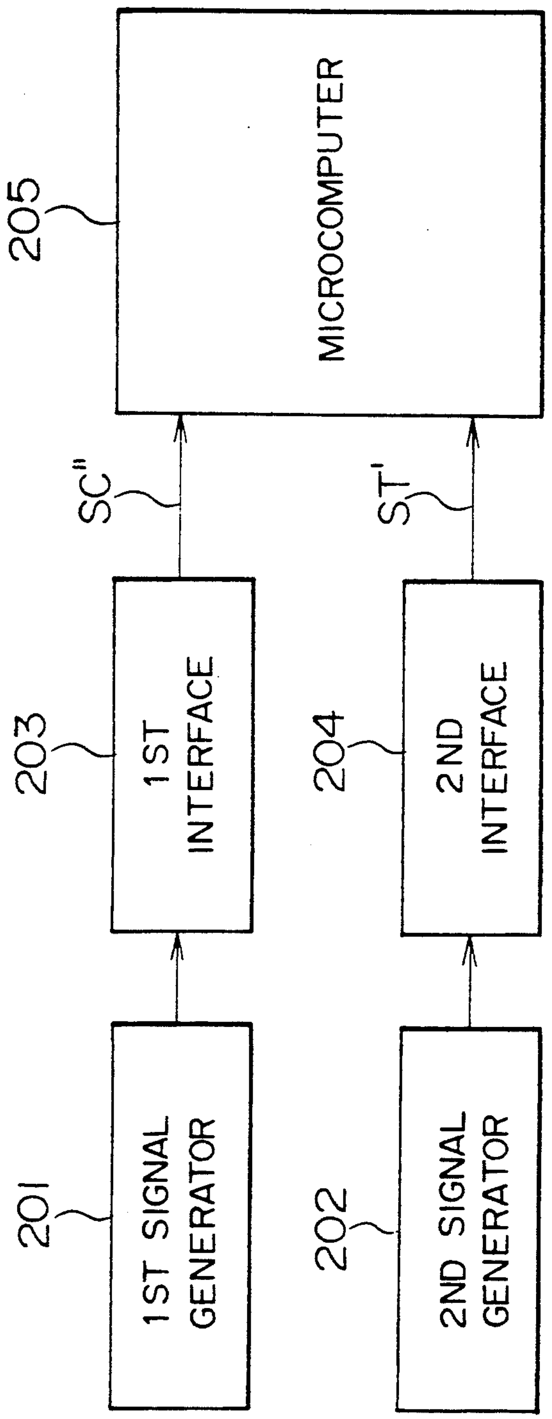
FIG. 8 is a block diagram similar to FIG. 1, but showing a conventional cylinder identifying apparatus for a multi-cylinder internal combustion engine.
Figure 9:
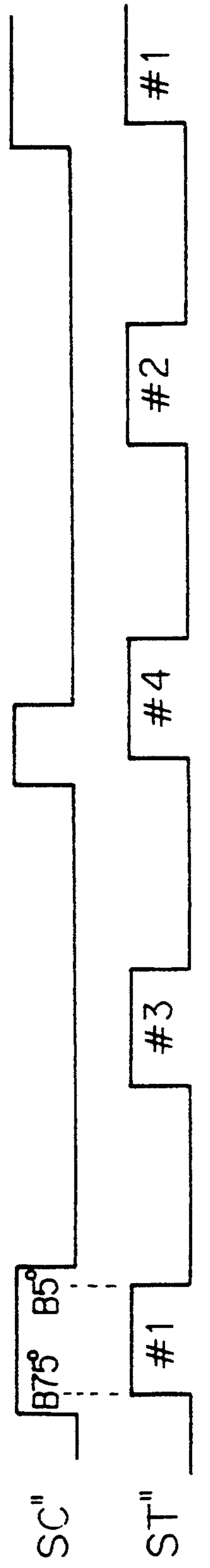
FIG. 9 is a waveform diagram showing the waveforms of signals used in the conventional apparatus of FIG. 9.

Referring to the drawings and first to FIG. 1, therein is illustrated in block form a cylinder identifying apparatus for a multi-cylinder internal combustion engine constructed in accordance with a first embodiment of the invention. In this embodiment, the invention is applied to a four-cylinder internal combustion engine. A first or cylinder identifying signal generator 1 is provided on a camshaft of the engine, which is operatively connected with a crankshaft in synchronized rotation therewith, for generating a cylinder identifying signal SC containing a series of plural kinds of rectangular-shaped pulses which have relatively large pulse widths and correspond to specific cylinders (e.g., cylinder #1 and cylinder #2 in the illustrated embodiment), as depicted in FIG. 2. Different kinds of cylinder identifying pulses SC each for a corresponding specific cylinder or cylinder group have different pulse widths. In the illustrated example of FIG. 2, a first kind of cylinder identifying pulse corresponding to cylinder #1 has a relatively wide pulse width and a second kind of cylinder identifying pulse corresponding to cylinder #2 has a relatively narrow pulse width. For example, the first signal generator 1 may be the same as the one employed with the conventional apparatus of FIG. 8. That is, it comprises a rotating disk which is fixedly mounted on the unillustrated camshaft for integral rotation therewith and has a plurality of arcuate slits formed therethrough and corresponding to the cylinders of the engine, each of the slits having a leading edge corresponding to a second reference position (e.g., B75°) of a cylinder and a trailing edge corresponding to a first reference position (e.g., B5°) thereof, and optical sensing means in the form of a photocoupler for sensing each slit in the rotating disk each time it takes a predetermined location during the rotation of the disk. The output signal SC from the first signal generator 1 is supplied to a reference signal generating circuit 2 via an interface 3.

A second signal generator 4 in the form of a pulse signal generator is provided on the crankshaft for generating, in synchronization with the rotation with the crankshaft, a pulse signal comprising a series of pulses each representative of predetermined crank angles or positions for each cylinder. For example, the pulse signal generator 4 may comprise a ring gear which is mounted on the crankshaft for integral rotation therewith and has a plurality of gear teeth formed around the circumferential surface thereof at predetermined circumferential intervals, and an electromagnetic pickup which is disposed near the ring gear in such a manner that each time it faces one of the gear teeth of the ring gear during the rotation of the crankshaft, it generates an output pulse generally in the form of a sharp sinusoidal pulse.

The pulse signal P from the second or pulse signal generator 4 is fed to a waveform shaper 5 where it is waveform shaped to provide a waveform-shaped pulse signal P' comprising a series of rectangular-shaped pulses each having a limited pulse width which falls at a crank angle of 75° or 5° before top dead center of each cylinder (hereinafter referred to as B75° or B5°). The thus shaped pulse signal P' is then fed to the reference signal generating circuit 2 which generates a reference position signal ST comprising a series of rectangular-shaped pulses each having a relatively large pulse width, as depicted at ST in FIG. 2. Specifically, each pulse of the reference position signal ST has a rising edge upon the falling of a rectangular-shaped pulse of the waveform-shaped pulse signal P' at B75° and a falling edge upon the falling of the following rectangular-shaped pulse of the waveform-shaped pulse signal P' at B5°. The reference position signal ST thus generated is fed to a control unit in the form of a microcomputer 6.

The reference position signal generating circuit 2 includes a reference position identifying section 2A which identifies the first and second reference positions of each cylinder based on the shaped pulse signal P' from the waveform shaper 5 and the cylinder identifying signal SC from the first signal generator 1 to generate a cylinder identifying information signal C which is fed to the microcomputer 6. On the basis of the cylinder identifying information signal C and the reference position signal ST, the microcomputer 6 properly controls engine operation such as ignition timing, fuel injection timing for each cylinder in an accurate manner.

More specifically, the reference signal generating circuit 2 senses the level of the cylinder identifying signal SC upon the falling of each pulse of the shaped pulse signal P' (three successive times in the illustrated example) for determining whether it is at a high level ("1") or at a low level ("0"). Based on a series of three consecutive values thus determined, the reference signal generating circuit 2 identifies to which cylinder and to which reference position thereof the falling edge of each of the three consecutive pulses ST corresponds by using an appropriate table or data previously stored in the microcomputer 6. For example, the falling edge of the last one of three consecutive pulses ST is identified on the basis of a series of three SC signal levels in the following manner:

| SC SIGNAL LEVEL SERIES | CYLINDER AND REFERENCE POSITION |
|---|---|
| [1, 0, 1] | 2nd ref. position B75° of cylinder #1 |
| [0, 1, 1] | 1st ref. position B5° of cylinder #1 |

-continued

| SC SIGNAL LEVEL SERIES | CYLINDER AND REFERENCE POSITION |
|---|---|
| [1, 1, 1] | 2nd ref. position B75° of cylinder #3 |
| [1, 1, 0] | 1st ref. position B5° of cylinder #3 |
| [1, 0, 0] | 2nd ref. position B75° of cylinder #4 |
| [0, 0, 0] | 1st ref. position B5° of cylinder #4 |
| [0, 0, 1] | 2nd ref. position B75° of cylinder #2 |
| [0, 1, 0] | 1st ref. position B5° of cylinder #2 |

For example, the reference position signal generating circuit 2 can encode the reference positions thus identified to provide cylinder identifying information C which, along with the reference position signal ST, is then input to the microcomputer 6. Thus, upon generation of only three pulses of the waveform-shaped pulse signal P', the cylinder and the reference position thereof corresponding to the falling edge of the last one of the three consecutive pulses can be concurrently and exactly identified at a very early stage of engine start-up or cranking operation.

In this manner, once the cylinder identifying information C for a cylinder is first input to the microcomputer 6, the following cylinders and their reference positions can thereafter be successively identified on the basis of the reference position signal ST successively supplied from the reference signal generating circuit 2 to the microcomputer 6 since the sequence of operations of the cylinders is predetermined. Therefore, the cylinder identifying information C may be generated only once for the first identified cylinder.

Moreover, the reference position signal ST generated by the reference signal generating circuit 2 is completely synchronized with the rotation of the crankshaft, so it has a waveform which exactly rises at the second reference position B75° of each cylinder and exactly falls at the first reference position B5° of each cylinder. Thus, the reference position signal ST involves no error, making it possible to perform the most accurate detection of reference positions of each cylinder.

In this manner, a highly accurate reference position signal St is generated on the basis of the cylinder identifying signal SC, which comprises a plurality of kinds of pulses having different pulse widths and which are generated in synchronism with the rotation of the camshaft, and the reference position signal P', which is exactly synchronized with the rotation of the crankshaft, whereby the computer 6 can accurately control the engine.

Figure 3:
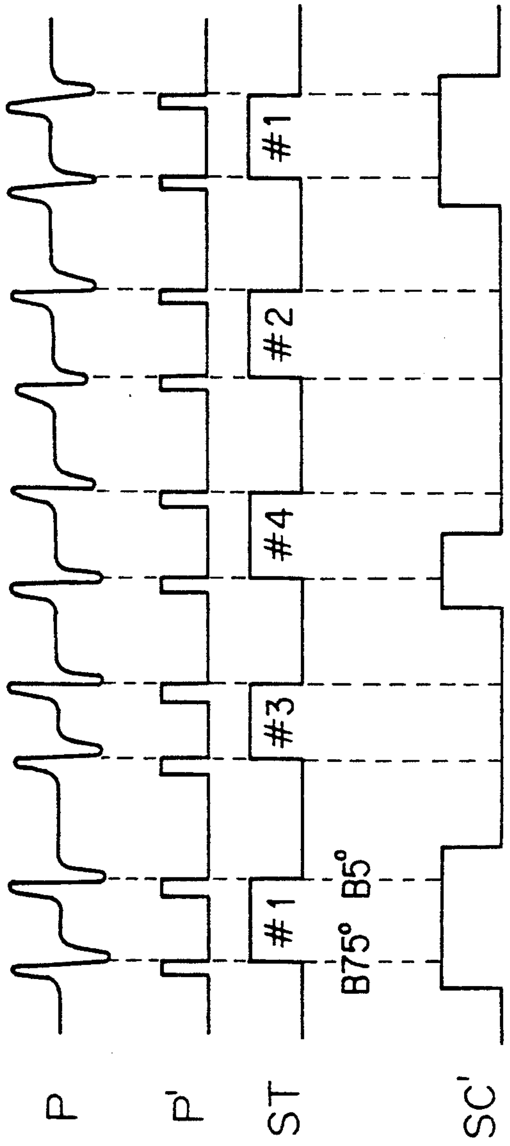
FIG. 3 is a view similar to FIG. 2, but showing another example of waveforms of various signals used in the apparatus of FIG. 1.

FIG. 3 shows another example of various signals P, P', ST and SC' usable with the apparatus of FIG. 1. In this example, the reference position pulse signal P generated by the second or pulse signal generator 4, the waveform-shaped pulse signal P' and the reference position signal ST are the same as those illustrated in FIG. 2, but the cylinder identifying signal SC' is different from the signal SC of FIG. 2 in that it contains a first kind of rectangular pulse which corresponds to a first specific cylinder #1 and which has a wide pulse width greater than an angular distance or crank angle between the falling edges of successive pulses of the waveform-shaped pulse signal P' (i.e., between the first and second reference positions for each cylinder), and a second kind of rectangular pulse which corresponds to a second specific cylinder #4 and which has a narrow pulse width smaller than the angular distance between the falling edges of successive pulses of the waveform-shaped pulse signal P'. Namely, the pulse width of the first kind of pulse for the first specific cylinder #1 is preset such that the level thereof is high at the falling edges of two successive pulses of the pulse signal P'. On the other hand, the pulse width of the second kind of pulse is such that the level thereof is high and low, respectively, at the falling edges of two successive pulses of the shaped reference position pulse signal P'.

In this case, the reference position identifying section 2A of the reference position signal generating circuit 2 identifies the cylinders and their reference positions in the following manner. If the level of the cylinder identifying signal SC' is high at the falling edges of two successive pulses of the waveform-shaped pulse signal P', it is determined that the falling edge of the first or preceding one of the two pulses corresponds to the second reference position B75° of the first specific cylinder #1, and that the falling edge of the second or following one of the two pulses corresponds to the first reference position B5° of the first specific cylinder #1. Also, if the level of the cylinder identifying signal SC' is high and low at the falling edges of two successive pulses of the waveform-shaped pulse signal P', it is determined that the falling edge of the first or preceding one of the two pulses corresponds to the second reference position B75° of the second specific cylinder #4, and that the falling edge of the second or following one of the two pulses corresponds to the first reference position B5° of the second specific cylinder #4. Once cylinder identification is made in the above-described manner, the following pulses and their falling edges can be automatically identified since the sequence of operations of the cylinders is predetermined.

Figure 4:
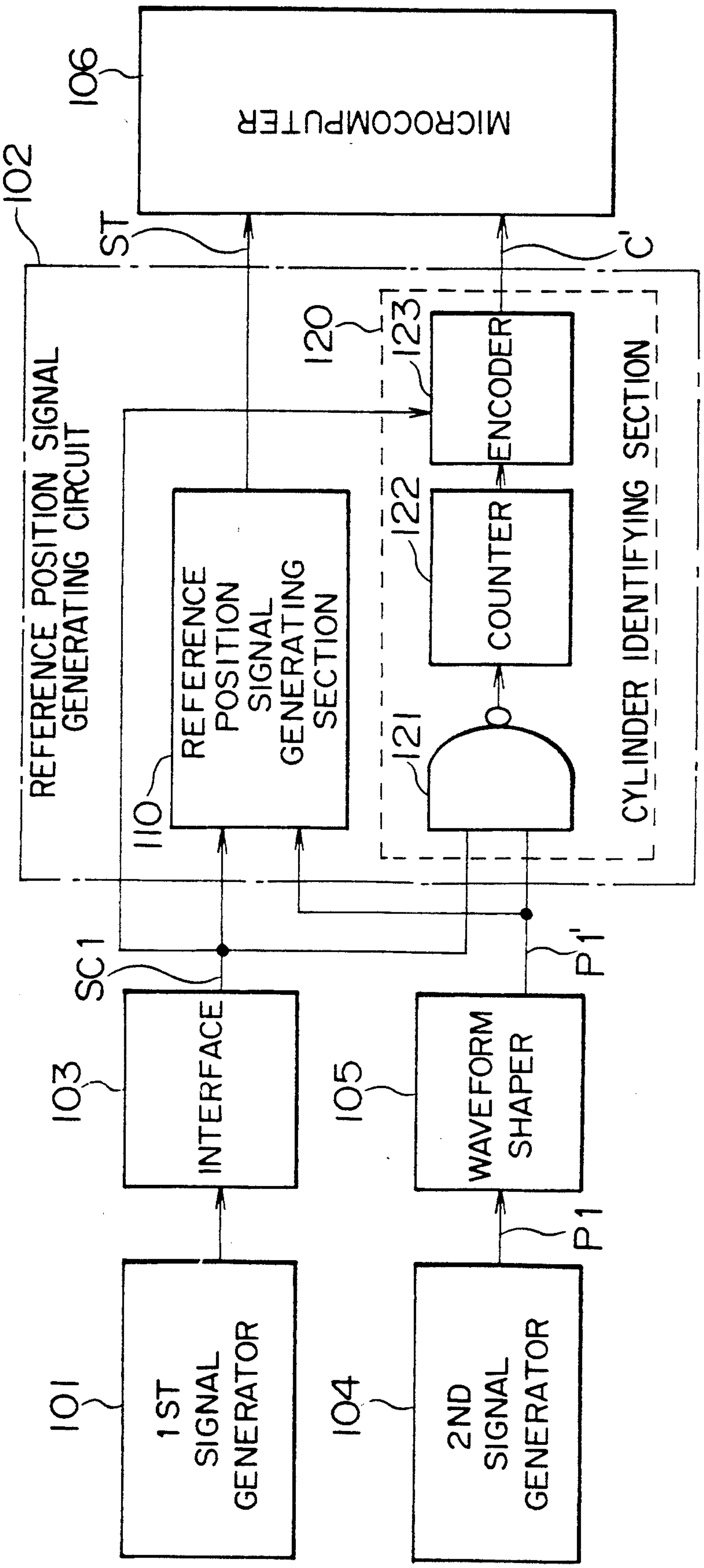
FIG. 4 is a view similar to FIG. 1, but showing another embodiment of the invention.
Figure 5:
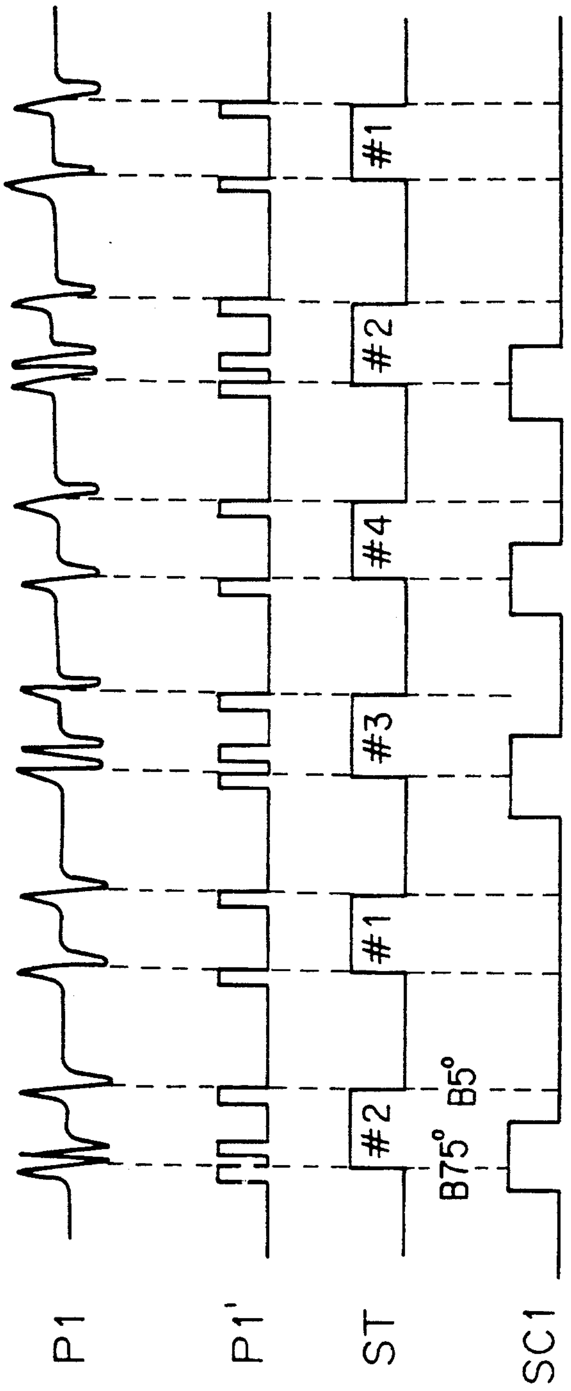
FIGS. 5 through 7 are waveform diagrams respectively showing different examples of the waveforms of signals which are adapted to be used with the apparatus of FIG. 4.

FIG. 4 illustrates another embodiment of the invention, and FIG. 5 illustrates the waveforms of various signals used in this embodiment. This embodiment is substantially similar to the previous embodiment of FIG. 1 except for the following. Specifically, a first or cylinder identifying signal generator 101, which is provided on a camshaft of the engine as in the previous embodiment of FIG. 1, generates, in synchronization with the rotation of the camshaft, a cylinder identifying signal SC1 comprising a plurality of rectangular-shaped pulses each having the same pulse width and corresponding to non-specific cylinders (e.g., cylinders #2, #3 and #4) with the failure or absence of a pulse corresponding to a specific cylinder (e.g., cylinder #1), as depicted at SC1 in FIG. 5. A second or pulse signal generator 104, which is provided on a crankshaft of the engine as in the previous embodiment of FIG. 1, generates, in synchronization with the rotation of the crankshaft, a pulse signal P1 containing a series of sharp sinusoidal pulses which comprises a group of first pulses generally corresponding to a second reference position (e.g., B75°) of each cylinder and a second pulse corresponding to a first reference position (e.g., B5°) of each cylinder. In the illustrated example of FIG. 5, the group of first pulses includes a series of two pulses of which the first or earlier one corresponds to the second reference position (B75°) of each cylinder, and the second or later one thereof is used for identifying a particular group of cylinders (e.g., cylinders #2 and #3). The output pulse signal P1 from the second signal generator 104 is fed to a waveform shaper 105 wherein each sharp sinusoidal pulse thereof is waveform shaped into a sharp rectangular-shaped pulse to provide a waveform-shaped pulse signal P1' which is then fed to a reference position signal generating circuit 102.

The reference position signal generating circuit 102 includes a reference position signal generating section 110 for generating a reference position signal ST indicative of first and second predetermined reference positions (e.g., B5° and B75°) of each cylinder, and a cylinder identifying section 120 for counting the number of pulses (i.e., the number of falling edges of pulses) in the waveform-shaped pulse signal P1' during each high level of the cylinder identifying signal SC1 and generating a cylinder identifying information signal C' used for cylinder identification.

The reference position signal generating section 110 is connected at its input side to the first signal generator 101 via an interface 103 and to the second signal generator 104 via the waveform shaper 105, and at its output side to a control unit in the form of a microcomputer 106. Based on the output pulse signal SC1 from the first signal generator 101 and the shaped pulse signal P1' from the waveform shaper 105, the reference position signal generating section 110 generates a reference position signal ST comprising a series of rectangular-shaped pulses, each of which rises upon the falling of the first or earliest pulse of each two pulse group, i.e., at the second reference position (B75°) of each cylinder, and falls upon the falling of a first pulse, i.e., at the first reference position (B5°) of each cylinder, as depicted at ST in FIG. 5.

The cylinder identifying section 120 comprises a NAND gate 121 which has a first input terminal connected to the interface 103, a second input terminal connected to the waveform shaper 105 and an output terminal for generating an output signal when one of the input terminals thereof is high and the other input terminal is low, a counter 122 for counting the number of outputs from the NAND gate 121, and an encoder 123 connected to receive the output signal from the counter 122 and the output signal SC1 from the first signal generator 101 via the interface 103 for identifying the cylinder corresponding to each pulse of the reference position signal ST and properly encoding the result of cylinder identification into appropriate data such as a two-bit code which is then fed to an unillustrated input port of the microcomputer 106 upon the falling of each pulse of the reference position signal ST, i.e., at the first reference position B5° of each cylinder. Specifically, based on the counted value of the counter 122 (i.e., the number of falling edges of pulses P1' during a high level of the cylinder identifying signal SC1), the encoder 123 identifies the specific cylinder #1 or groups of other cylinders #2 through #4. That is, it is identified that count "0", "1" and "2" correspond to cylinder #1, cylinder #4, and a group of cylinders #2 and #3, respectively. In this case, once cylinder #1 or #4 has been identified, the other cylinders can be sequentially identified since the order of operation of the cylinders is predetermined.

The microcomputer 106 fetches the thus input cylinder identifying information or data C' upon occurrence of the second reference position B75° of each cylinder and performs cylinder identification through software processing. For example, the relation between the cylinder identifying information C' in the form of a two-bit code and a corresponding cylinder is expressed as follows.

| CYLINDER IDENTIFYING INFORMATION C' | IDENTIFIED CYLINDER |
|---|---|
| [1, 1] | cylinder #1 |
| [1, 0] | cylinder #3 |
| [0, 1] | cylinder #4 |
| [0, 0] | cylinder #2 |

As a result, the microcomputer 106 can quickly carry out cylinder and reference position identification at the second reference position B75° of the first or initial cylinder to be identified, thereby performing proper engine control in a very accurate manner based on the reference position signal ST which is completely synchronized with the rotation of the crankshaft and hence involves no error.

Although in the example of FIG. 5, the cylinder identifying signal SC1 generated by the first signal generator 101 comprises a series of rectangular pulses of the same pulse width corresponding to non-specific cylinders (e.g., cylinders #2, #3 and #4) while containing no pulse corresponding to a specific cylinder (e.g., cylinder #1), it may be composed of other kinds of pulses.

Figure 6:
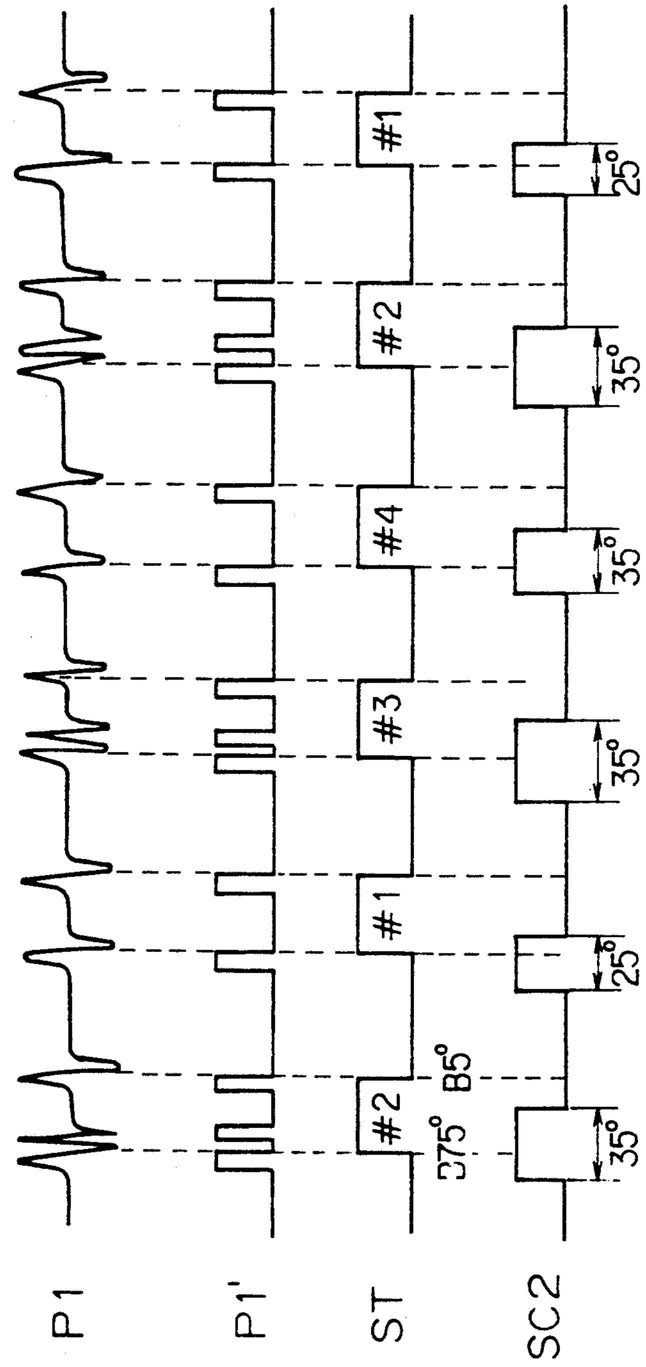

For example, as illustrated in FIG. 6, a cylinder identifying signal SC2 can be formed such that it comprises a series of rectangular pulses of the same pulse width (e.g., a crank angle or distance of 35°) corresponding to non-specific cylinders #2, #3 and #4 and a pulse of a different pulse width (e.g., a crank angle of 25°) corresponding to a specific cylinder #1. In this case, the encoder 123 can identify or discriminate the specific cylinder #1 from the other cylinders based on the difference in the pulse width between the pulses in the cylinder identifying signal SC2.

Moreover, although in the foregoing embodiments, the present invention is applied to a four-cylinder internal combustion engine, it can be equally applied to a multi-cylinder internal combustion engine having any number of cylinders.

Figure 7:
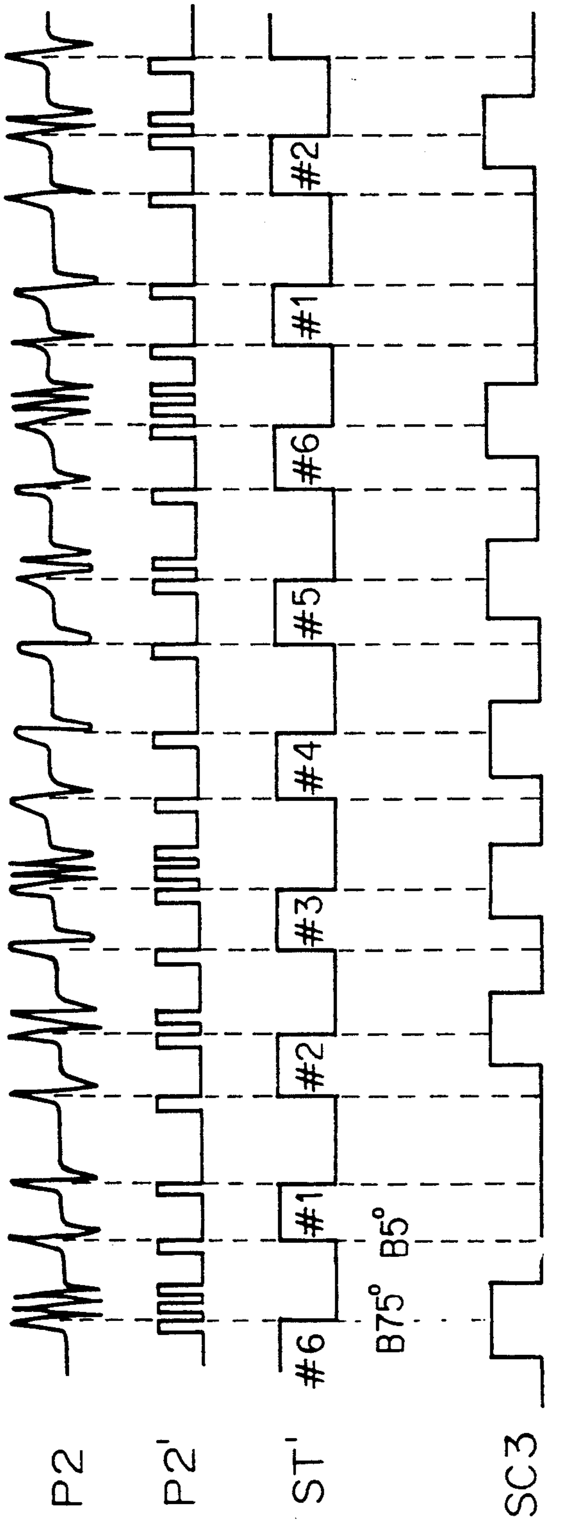

Thus, FIG. 7 illustrates the waveforms of various signals adapted to be used with a six cylinder internal combustion engine. In this example, a cylinder identifying signal SC3 generated by the first signal generator 101 comprises a series of five rectangular pulses of the same pulse width corresponding to five non-specific cylinders #2 through #6 and a failure or absence of a pulse corresponding to a specific cylinder #1. A reference position pulse signal P2 generated by the second signal generator 104 and hence a waveform-shaped pulse signal P2' generated by the waveform shaper 105 comprise a first pulse corresponding to the first reference position B5° of each cylinder, and a plurality of groups of sharp second pulses generally corresponding to the second reference position B75° of each cylinder. That is, the groups of second pulses comprise a first group containing one sharp pulse for cylinders #1 and #4, a second group containing two sharp pulses for cylinders #2 and #5, and a third group containing three pulses for cylinders #3 and #6. A reference position signal ST' comprises a series of rectangular pulses which correspond to the cylinders #1 through #6 and each of which rises upon the falling of each first pulse of the waveform-shaped reference position pulse signal P2' (i.e., at B5°), and falls upon the falling of the first or earliest pulse of each group (i.e., at B75°) thereof.

In this example, the cylinder groups are identified by counting the number of pulses in the waveform-shaped reference position pulse signal P2' during each high level of the cylinder identifying signal SC3. The specific cylinder #1 is identified based on the failure or absence of a pulse in the cylinder identifying signal SC3.

The results of the above cylinder identification can be encoded into three-bits data or two-bits data, in the latter of which one code is assigned to the specific cylinder #1 and the other three codes are assigned to the three groups of cylinders, respectively.

In the above embodiment, the number of pulses in each group of the pulse signal reference position P1 or P2 can be arbitrarily set to any value, as necessary, as long as the cylinders and their predetermined reference positions can be identified based on these pulses.

What is claimed is:

1. A cylinder identifying apparatus for a multi-cylinder internal combustion engine having a crankshaft and a camshaft operatively coupled to the crankshaft for rotation therewith, said apparatus comprising:
   - a single, first signal generator (1; 101) provided on the camshaft for generating a cylinder identifying signal in synchronization with the rotation of the camshaft;
   - a second signal generator (4; 104) provided on the crankshaft for generating, in synchronization with the rotation of the crankshaft, a pulse signal containing a series of pulses each corresponding to a predetermined crank position of each cylinder; and
   - reference position signal generating means (2; 102) for generating, based on the output signals from said first and second generators, a reference position signal containing a series of pulses each exactly indicating the predetermined crank position of each cylinder, and a cylinder identifying information signal indicative of the cylinder corresponding to each pulse of the reference position signal, wherein said cylinder identifying signal comprises a series of a plurality of rectangular-shaped pulses each corresponding to a specific cylinder and having pulse widths different from each other.

2. A cylinder identifying apparatus for a multi-cylinder internal combustion engine having a crankshaft and a camshaft operatively coupled to the crankshaft for rotation therewith, said apparatus comprising:
   - a single, first signal generator (1; 101) provided on the camshaft for generating a cylinder identifying signal in synchronization with the rotation of the camshaft;
   - a second signal generator (4; 104) provided on the crankshaft for generating, in synchronization with the rotation of the crankshaft, a pulse signal containing a series of pulses each corresponding to a predetermined crank position of each cylinder; and
   - reference position signal generating means (2; 102) for generating, based on the output signals from said first and second generators, a reference position signal containing a series of pulses each exactly indicating the predetermined crank position of each cylinder, and a cylinder identifying information signal indicative of the cylinder corresponding to each pulse of the reference position signal, wherein said cylinder identifying signal comprises a series of rectangular pulses of the same pulse width corresponding to non-specific cylinders with the absence of a pulse corresponding to a specific cylinder.

3. A cylinder identifying apparatus for a multi-cylinder internal combustion engine having a crankshaft and a camshaft operatively coupled to the crankshaft for rotation therewith, said apparatus comprising:

a single, first signal generator (1; 101) provided on the camshaft for generating a cylinder identifying signal in synchronization with the rotation of the camshaft;

a second signal generator (4; 104) provided on the crankshaft for generating, in synchronization with the rotation of the crankshaft, a pulse signal containing a series of pulses each corresponding to a predetermined crank position of each cylinder; and reference position signal generating means (2; 102) for generating, based on the output signals from said first and second generators, a reference position signal containing a series of pulses each exactly indicating the predetermined crank position of each cylinder, and a cylinder identifying information signal indicative of the cylinder corresponding to each pulse of the reference position signal, wherein said pulse signal generated by said second signal generator comprises a first pulse corresponding to a first predetermined reference position of each cylinder, and a series of second pulses of which the earliest one corresponds to a second predetermined reference position of each cylinder.

4. A cylinder identifying apparatus according to claim 3, wherein the second pulses comprise a plurality of pulse groups each corresponding to one of the cylinders and being different in the number of pulses from each other to serve for cylinder identification.

5. A cylinder identifying apparatus for a multi-cylinder internal combustion engine having a crankshaft and a camshaft operatively coupled to the crankshaft for rotation therewith, said apparatus comprising:

a single, first signal generator (1; 101) provided on the camshaft for generating a cylinder identifying signal in synchronization with the rotation of the camshaft;

a second signal generator (4; 104) provided on the crankshaft for generating, in synchronization with the rotation of the crankshaft, a pulse signal containing a series of pulses each corresponding to a predetermined crank position of each cylinder; and reference position signal generating means (2; 102) for generating, based on the output signals from said first and second generators, a reference position signal containing a series of pulses each exactly indicating the predetermined crank position of each cylinder, and a cylinder identifying information signal indicative of the cylinder corresponding to each pulse of the reference position signal, wherein said reference position signal generating means comprises:

a reference position signal generating section for generating a reference position signal indicative of a first and a second predetermined reference position of each cylinder; and a cylinder identifying section for counting the number of pulses in the reference position pulse signal from said second pulse generator during each high level of the cylinder identifying signal and generating a cylinder identifying information signal used for cylinder identification.

* * * * *